United States Patent [19]
Naito

[11] 4,393,693
[45] Jul. 19, 1983

[54] APPARATUS AND METHOD FOR DETECTING CRANK SHAFT ORIENTATION AND VALVE ASSEMBLY IN AN INTERNAL COMBUSTION ENGINE

[75] Inventor: Tadashi Naito, Toyota, Japan

[73] Assignee: Toyota Jidosha Kabushiki Kaisha, Toyota, Japan

[21] Appl. No.: 226,544

[22] Filed: Jan. 21, 1981

[30] Foreign Application Priority Data

Jan. 22, 1980 [JP] Japan .................................... 55-5980

[51] Int. Cl.[3] ........................ F02P 17/00; G01M 15/00

[52] U.S. Cl. ................................ 73/116; 33/180 AT; 33/181 AT; 73/118

[58] Field of Search ...................... 73/116, 118, 119 R; 33/180 AT, 181 AT

[56] References Cited

U.S. PATENT DOCUMENTS

| | | | |
|---|---|---|---|
| 2,072,984 | 3/1937 | Haskins | 73/116 |
| 2,819,534 | 1/1958 | Kitzman | 33/181 AT |
| 3,456,501 | 7/1969 | Walker et al. | 33/180 AT |
| 3,889,528 | 6/1975 | Grikscheit et al. | 73/119 R |
| 3,988,925 | 11/1976 | Seccombe et al. | 33/180 AT |
| 4,235,101 | 11/1980 | Stadelmann | 73/116 |

*Primary Examiner*—Howard A. Birmiel
*Attorney, Agent, or Firm*—Kenyon & Kenyon

[57] ABSTRACT

The positions of selected valves are determined by measurement of their respective retainers by means of displacement gauges. When a given piston is at top dead center in the compression stroke, the retainers of the intake and exhaust valves of that piston are not displaced, but when that same piston is at the top dead center position in the exhaust stroke the intake and exhaust valve retainers of that cylinder are displaced to known positions as are intake and exhaust valve retainers of certain other cylinders, thereby indicating whether the crank position is such as to place the selected piston in the top dead center position of the compression stroke or in the top dead center position of the exhaust stroke. Inability to obtain correct correlated readings for the retainers of the related valves indicates likelihood of misassembly of the cotters on one or more of the valves.

8 Claims, 7 Drawing Figures

APPARATUS AND METHOD FOR DETECTING CRANK SHAFT ORIENTATION AND VALVE ASSEMBLY IN AN INTERNAL COMBUSTION ENGINE

BACKGROUND OF THE INVENTION

1. Field of the Invention

The present invention relates to the detection of the positions of selected valves in an internal combustion engine to determine whether the crank shaft is oriented at a position identified as the 0° position or the 360° position. In particular the invention relates to detection of the position of valve retainers to discover misassembly of components associated with the valves while identifying the angular location of the 0° and 360° positions.

2. Description of the Prior Art

The adjustment of valve clearance in internal combustion engines on a production line has heretofore been carried out manually by making visual observation of the valve stems and assemblies. In order to mechanize valve clearance adjustment, it is necessary to detect certain angular positions of the crank shaft identified by ultimate phases of the top dead center of a selected piston in the compression stroke and in the exhaust stroke. It is well known that, in a 4-cycle internal combustion engine, the position of the crank shaft is exactly the same when a given piston is at its top dead center in the compression stroke and in the exhaust stroke, but the positions of the valves of that cylinder are not the same for the two top dead center positions. Adjustment of valve clearance by automatic means also requires that the valves and cotters be checked for proper assembly.

The conventional practice for observing the valve locations to determine top dead center positions of the piston in the first cylinder of the engine include watching the intake and exhaust valves of the first cylinder to see that the rocker arms controlling these valves are in contact with the base circle portions of the respective cam lobes. If they are, and if a clearance can be seen between the ends of the valve stems and the rocker arms, the piston of the first cylinder is considered to be in its top dead center position in the compression stroke, but if there is no clearance between the rockers and the valve stems, the piston of the cylinder is considered to be in its top dead center position in the exhaust stroke.

The proper assembly of the valve components has been determined by visual inspection of the cotters of the intake and exhaust valves of the engine, and no automatic mechanical means of doing this task have been available heretofore.

OBJECTS AND SUMMARY OF THE INVENTION

It is one of the main objects of the present invention to provide for detecting the positions of the intake and exhaust valves in an internal combustion engine without relying on visual observation and manual manipulation of detecting apparatus.

Another object is to provide for detecting when a given piston is in its top dead center position in the compression stroke and in its top dead center position in the exhaust stroke.

A still further object of the invention is to provide for detecting improper assembly of valves and cotters in an internal combustion engine.

A further object of the invention is to provide automatic means for determining whether a crank angle indicated by a crank angle index device corresponds to top dead center position of a particular piston in the compression stroke or top dead center of that piston in the exhaust stroke, so as to indicate whether the crank angle is in a position identified as the 0° or 360° position, respectively.

Further objects of the present invention will be described in the following specification together with the drawings.

DETAILED DESCRIPTION OF THE INVENTION

Figure 1:
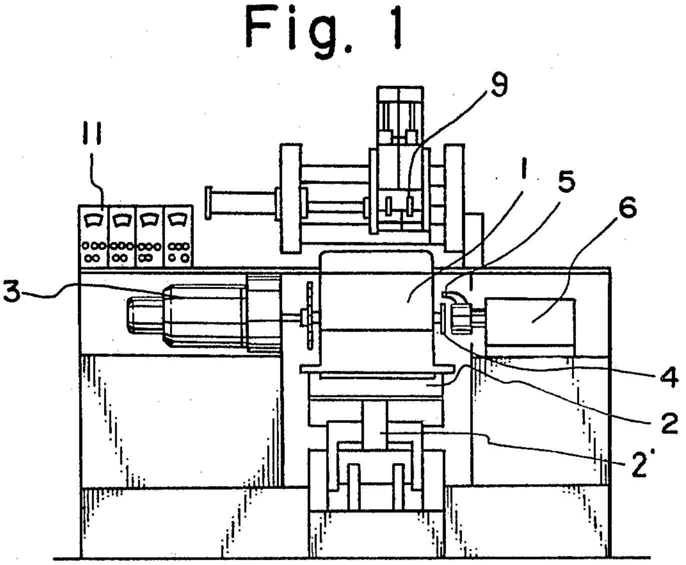
FIG. 1 is a front elevational view of one embodiment of apparatus for detecting valve positions in an internal combustion engine.

In FIG. 1 an internal combustion engine 1 is mounted on a pallet 2 to be lifted into a specified inspection position by an elevator 2'. A crank angle index device 3, which may be a motor connected to rotate the crank shaft and determine the crank angle, is coupled either directly or indirectly to the crank shaft at one end of the engine 1. A crank pulley 4 at the other end of the engine 1 is in position to be inspected by a displacement gauge 5 mounted on a crank angle determining reference sensor device 6. The displacement gauge 5 preferably detects a V-shaped notch or groove on the periphery of the pulley 4 and may be the type of device described in the co-pending application of Tadashi Naito entitled APPARATUS FOR SENSING THE PRESENCE AND POSITION OF A CRANK PULLEY BOLT IN AN INTERNAL COMBUSTION ENGINE, Ser. No. 226,543. By means of the crank angle index device 3 and the crank angle determining reference sensor 6, the crank angle of the engine can be set to a given position of the V-shaped notch relative to the displacement gauge 5. This position can correspond either to a 0° position of the engine crank shaft or to a 360° position, particularly with reference to a specific piston in the engine.

Figure 2:
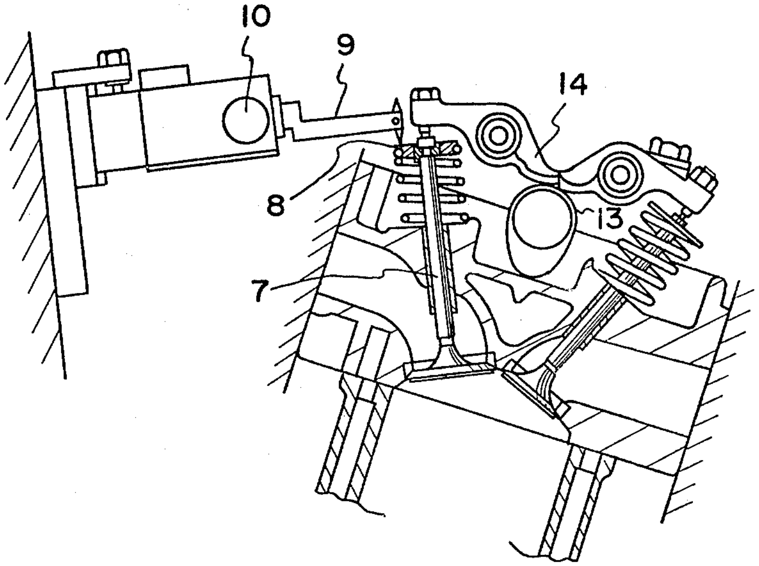
FIG. 2 is a fragmentary view, partially in cross-section, of a displacement gauge and valve assembly in the apparatus in FIG. 1.

FIG. 2 shows an intake valve 7 of the engine 1 with a valve retainer 8 near its outer end and with a contact 9 extending from a displacement gauge 10 to a position where it can detect the location of the valve retainer 8, at least when the valve retainer is at or near the fully closed position of the valve. The displacement gauge 10 inputs the valve retainer height into a device 11. (See FIG. 6). As the displacement gauge 10, a mechanical dial indicator, eddy circuit, dial differential type device and the like may be employed. It is not necessary to detect the positions of the retainers 8 of all of the valves in the engine in order to determine whether a given piston is at its top dead center position for the exhaust stroke or at its top dead center position for the compression stroke. Only a few retainers need be measured, and these retainers are connected to valves identified as necessary valves associated with necessary cylinders.

Figure 3:
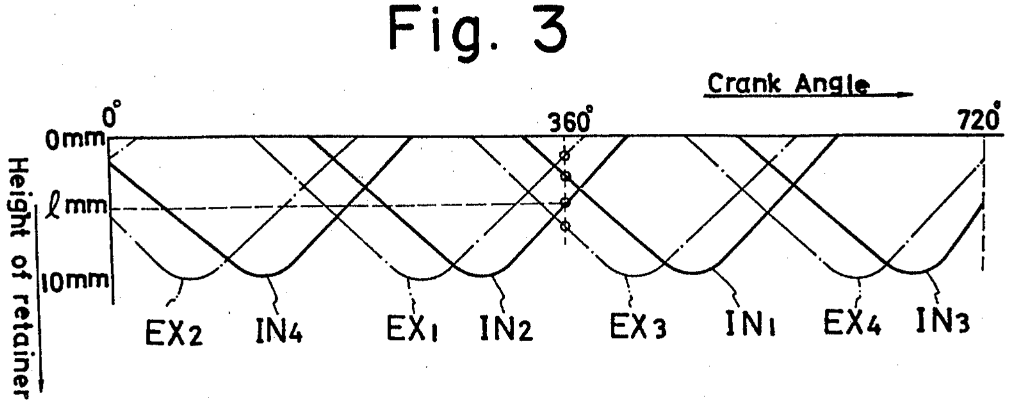
FIG. 3 is a diagram illustrating valve lift curves in the engine under measurement in the apparatus in FIG. 1.

As may be seen from the lift curves in FIG. 3, which correspond to the retainer, or valve, positions, at the 0° and 360° crank angle positions of the crank shaft, which relate to the top dead center of the piston of the first cylinder position in its compression and exhaust strokes, respectively, the intake and exhaust valves of that cylinder are displaced by 0,0 mm and $LIN_1$, $LEX_1$ mm, respectively. By utilizing this difference between the valve positions at 0° and 360°, that is, by determining that the valve heights measured by the displacement gauges 10 for the necessary valves corresponds to 0° or 360° of the crank angle, it is possible to determine whether the set crank angle is 0° or 360° without relying on visual observation of the engine and without relying on manual manipulation of the detecting apparatus.

A device 11 is shown in FIG. 1 for making the necessary judgement electrically, utilizing input obtained from displacement gauges 10. To improve the accuracy of the device 11 in detecting whether the crank angle is 0° or 360°, in the case of a 4-cylinder engine, the detection of the 0° position is accomplished by measuring the positions of four valves, the intake and exhaust valves of the first cylinder, the intake valve of the second cylinder, and the exhaust valve of the third cylinder. Detection of the 360° position is accomplished with reference to the other four valves of the engine, which are the exhaust valve of the second cylinder, the intake valve of the third cylinder, and the intake and exhaust valves of the fourth cylinder. By means of such determination, the crank angle set by means of the crank angle index device 3 and the crank angle determining reference sensor 6 can be mechanically identified as being either 0° or 360° and can be appropriately given as an indication or an output of the mechanized inspection apparatus.

Figure 4:
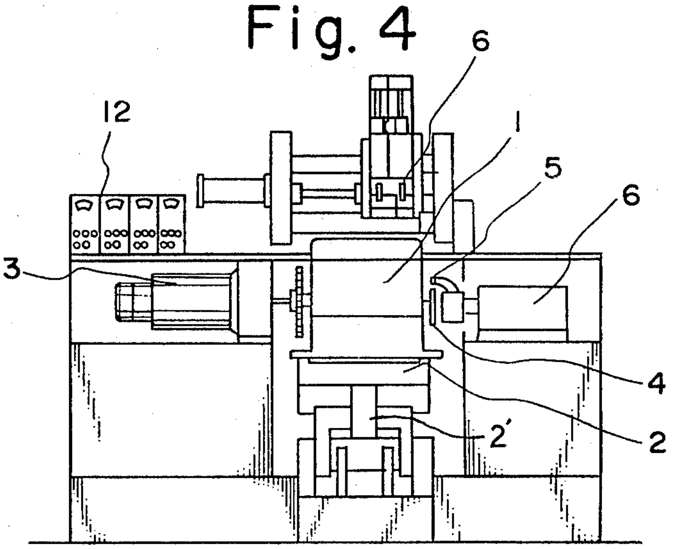
FIG. 4 is a front elevational view of a modified embodiment of the apparatus in FIG. 1.

The apparatus illustrated in FIG. 4 is similar to that in FIG. 1 except that it has a different valve-height detector-indicator 12. The detector-indicator 12 is electrically connected to the same displacement gauges 10 as the device 11 in FIG. 1. The detector-indicator 12 serves to detect and indicate whether the valve position measured by each displacement gauge 10 when the crank angle is 0° or 360° fits the normal valve position to within a specified tolerance. (See FIG. 7). If the retainer position is within the allowed tolerance, the assembly of the valve is correct, but if it is out of tolerance, it is probably due to misassembly of cotters or improper selection of the intake or exhaust valve.

Figure 5:
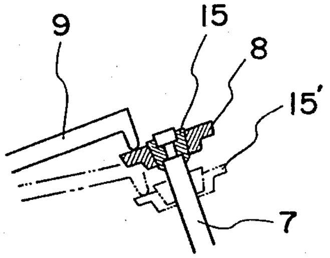
FIG. 5 is an enlarged fragmentary side view of the end of the valve stem of a valve in FIG. 2.

For example, if the crank angle is determined to be 0°, the rocker arm 14, as shown in FIG. 2, should be in contact with the cam base circle 13, and the intake valve 7 should be closed. The position, or height, of the retainer 8 measured by engaging the contact 9 of the displacement gauge 10 can be used to determine whether the cotter has been properly assembled. As shown in FIG. 5, if the cotter is held in the valve groove in the normal position 15, the contact 9 will occupy the position shown in full lines. On the other hand, if the cotter is misassembled to the position shown in dotted lines and indicated by reference numeral 15', the contact 9 will be displaced to the position 9', which is outside of the accepted range of positions. As a result, an abnormal indication will be given by the detector-indicator 12 in FIG. 4.

Thus it may be seen that the embodiment of the invention as shown in FIG. 1 permits detection of the crank angle as being in the top dead center position in the compression stroke or in the top dead center in the exhaust stroke, i.e., 0° or 360°, and this detection can be obtained without visual inspection of the engine and without manual operation of the detection apparatus. The second embodiment of the invention as shown in FIG. 4 makes it possible to detect, without relying upon visual inspection and manual manipulation, whether or not there has been a proper assembly of valves and cotters. Thus, the present invention permits mechanized inspection of components of the valve assembly of an internal combustion engine.

Figure 6:
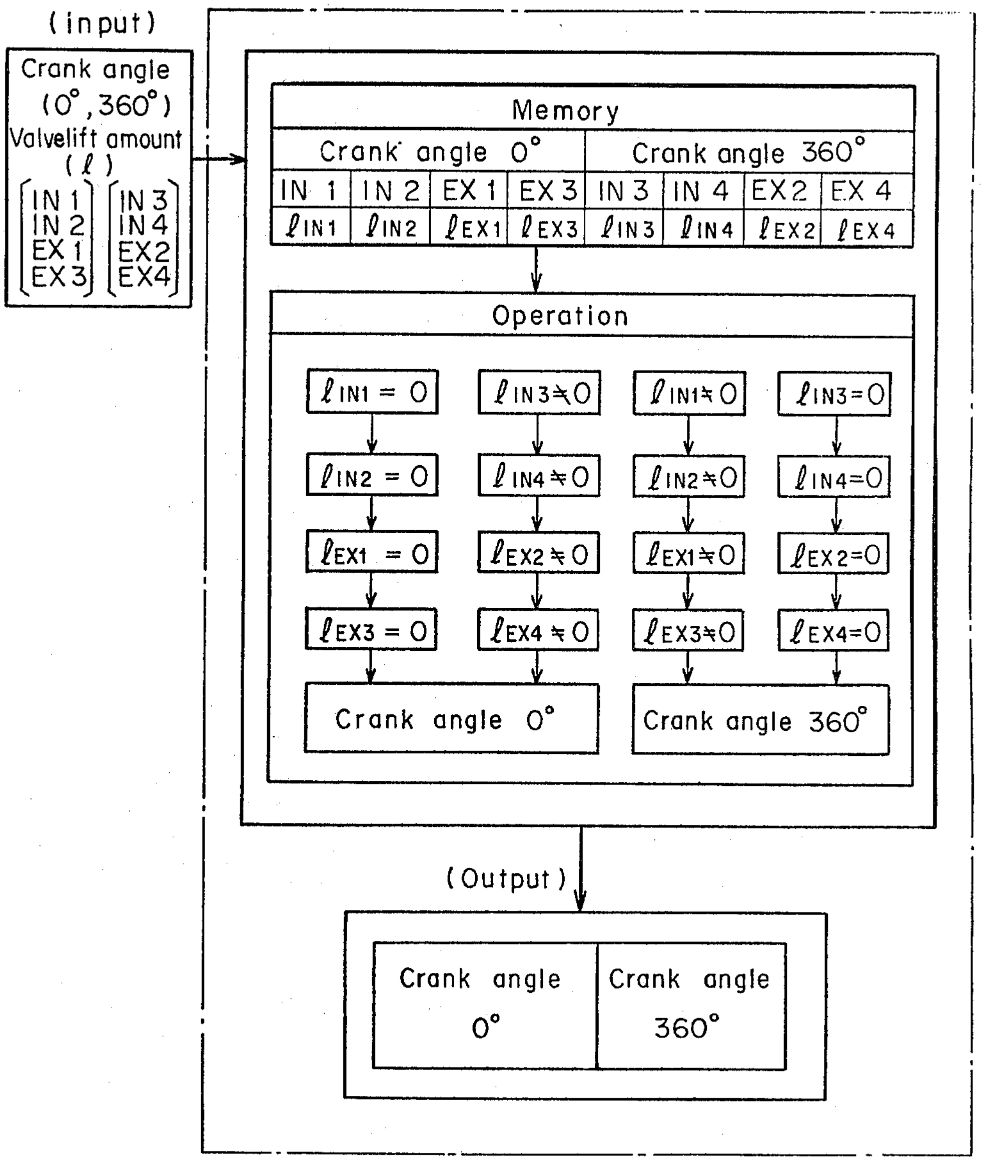
FIG. 6 is an operation circuit of a device 11.
Figure 7:
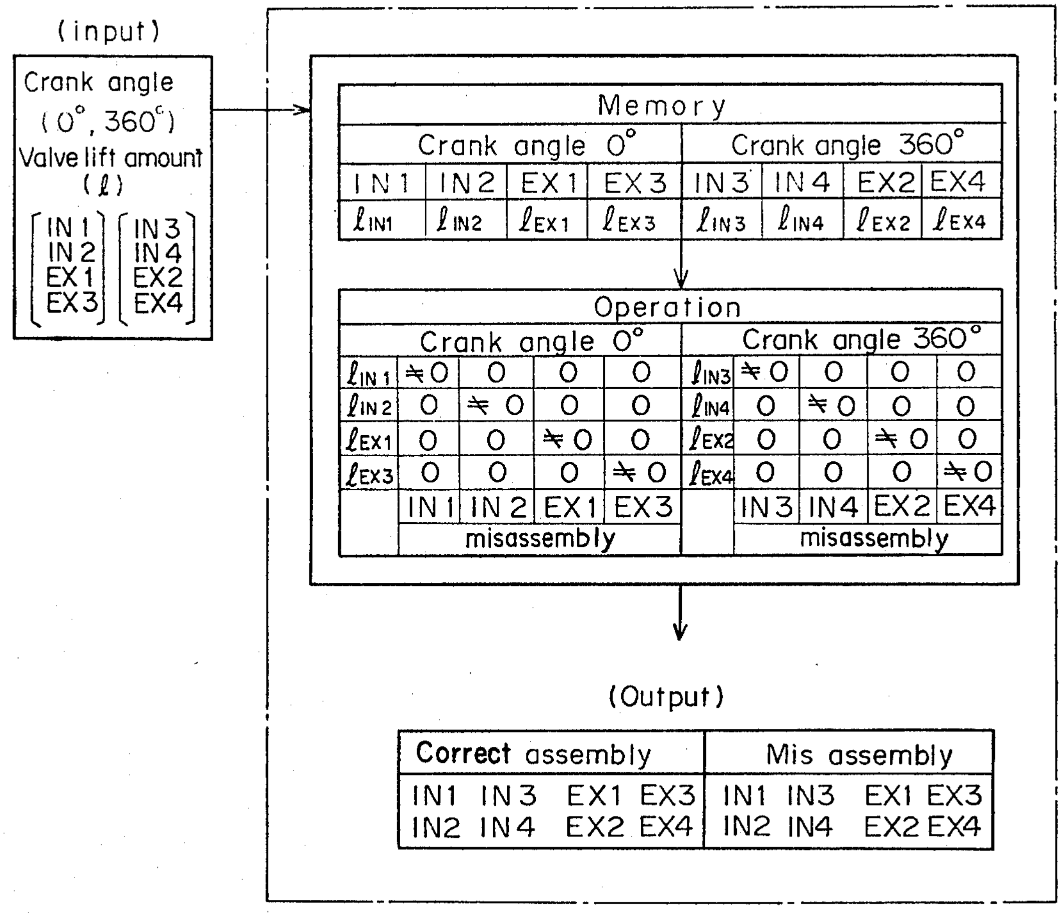
FIG. 7 is an operation circuit of a device 12.

Referring to FIGS. 6 and 7, the functions of the devices 11 and 12 are explained below.

The device 11 stores the valve lift amounts of the valves at 0° and 360° of the crank angles. That is, for a crank angle of 0°, the valve lift amounts ($lIN_1$, $lIN_2$, $lEX_1$, $lEX_3$) of the $IN_1$, $IN_2$, $EX_1$, $EX_3$ valves are respectively stored, and for a crank angle of 360°, the valve lift amounts ($lIN_3$, $lIN_4$, $lEX_2$, $lEX_4$) of the $IN_3$, $IN_4$, $EX_2$, $EX_4$ valves are stored by the device 11. Then when the outputs from the displacement gauges 10 are input into the device 11, if it is found that $lIN_1$, $lIN_2$, $lEX_1$, $lEX_3$ are all zero and none of $lIN_3$, $lIN_4$, $lEX_2$, $lEX_4$ are zero, by comparing the inputs with the stored values, the crank angle is judged to be zero. Such output value is displayed. When the crank angle is 360°, an operation similar to that in case of the crank angle being 0° is done to display that the crank angle is 360°.

FIG. 7 shows the operation circuit of the device 12, which both determines the crank angle and detects whether the assembly of the valves is correct or not. The operation circuit of the device 12 is substantially the same as that of the device 11, but it has an additional function that if, for example, only three of the valve lift amounts $lIN_1$, $lIN_2$, $lEX_1$, $lEX_3$ of the $IN_1$, $IN_2$, $EX_1$, $EX_3$ valves are zero in case of the crank angle being zero, the operation circuit indicates that the valve with the non zero valve lift amount being not zero is misassembled. In case of the crank angle being 360°, an operation similar to that in case of the crank angle being 0° is done. The results are displayed to indicate whether the assembly of the valves is correct or not.

While the engine has been described in terms of specific embodiments, it will be understood by those skilled in the art that modifications may be made therein without departing from the true scope of the invention as defined by the following claims.

What is claimed is:

1. Apparatus for the automatic inspection of a multicylinder four-cycle internal combustion engine having a crankshaft; a piston, an intake valve, and an exhaust valve for each cylinder, each being operatively coupled to the crankshaft; and a member rotatable with the crankshaft and having a detectable angular index, wherein the apparatus comprises:

a crank angle reference determining sensor means responsive to the index of the rotatable member of an engine to be inspected and positioned to detect said index when a predetermined piston of the engine is in a top dead center position;

a crank angle index device adapted to turn the crankshaft until the sensor means detects the index so as to place the predetermined piston in a top dead center position;

displacement gauge means for simultaneously measuring the positions of a plurality of preselected valves when the sensor means detects the index; and crank angle indicator means connected to the displacement gauge means and responsive to the displacement values of the plurality of preselected valves for distinguishing whether the piston is in the compression top dead center position or in the exhaust top dead center position.

2. The apparatus of claim 1 wherein the engine is a four-cylinder engine comprising first, second, third, and fourth cylinders in order in a row, and the preselected valves for distinguishing that the first cylinder is in the compression top dead center position are the intake and exhaust valves of said first cylinder, the intake valve of said second cylinder, and the exhaust valve of said third cylinder.

3. The apparatus of claim 1 wherein the engine is a four-cylinder engine comprising first, second, third, and fourth cylinders in order in a row, and the preselected valves for distinguishing that the first cylinder is in the exhaust top dead center position are the intake and exhaust valves of said fourth cylinder, the intake valve of said third cylinder, and the exhaust valve of said second cylinder.

4. A method for automatically inspecting a multi-cylinder four-cycle internal combustion engine having a crankshaft; a piston, an intake valve, and an exhaust valve for each cylinder, each being operatively coupled to the crankshaft; and a member rotatable with the crankshaft and having a detectable angular index, wherein the method comprises:

(a) turning the crankshaft of such an engine;

(b) detecting when the index on the rotatable member reaches a predetermined angular position corresponding to a top dead center position of a preselected piston;

(c) simultaneously measuring the positions of a plurality of preselected valves when the index is detected at the top dead center position; and (d) distinguishing in response to the displacement values of the plurality of preselected valves whether the preselected piston is at its compression top dead center position or its exhaust top dead center position.

5. The method of claim 4 further comprising:

(e) comparing the displacement values of each of a plurality of the preselected valves measured in step (c) with a corresponding predetermined acceptable range of values and (f) indicating if the measured value for any such valve is outside the limits of acceptable values for said valve.

6. The method of claim 4 wherein step (c) comprises simultaneously measuring the positions of a first group of valves normally having zero displacements when the preselected piston is in its compression top dead center position and non-zero displacements when the preselected piston is in its exhaust top dead center position, and step (d) comprises distinguishing that the preselected piston is in its compression top dead center position if the displacements of at least some of the first group of valves are zero.

7. The method of claim 6 wherein step (c) comprises simultaneously measuring the displacements of a second group of valves normally having zero displacements when the preselected piston is in its exhaust top dead center position and having non-zero displacements when the preselected piston is in its compression top dead center position, and step (d) comprises distinguishing that the preselected piston is in its exhaust top dead center position if the displacements of at least some of the second group of valves are zero.

8. The method of claim 7, further comprising:

(e) determining whether the displacement value is non-zero of any valve in whichever of said first and second groups of valves otherwise measures zero displacement in step (c) and (f) displaying the status of each non-zero displacement valve of the zero displacement group to indicate improper assembly of the valve.

* * * * *

UNITED STATES PATENT AND TRADEMARK OFFICE
CERTIFICATE OF CORRECTION

PATENT NO. : 4,393,693
DATED : July 19, 1983
INVENTOR(S) : Tadashi Naito

It is certified that error appears in the above—identified patent and that said Letters Patent is hereby corrected as shown below:

Change Assignee's Name from:

"Toyota Jidosha Kabushiki Kaisha" to

--Toyota Jidosha Kogyo Kabushiki Kaisha--.

Col. 4, line 44, after "lift" delete "amount being not zero".

Signed and Sealed this

*Twenty-second* Day of *November 1983*

[SEAL]

*Attest:*

GERALD J. MOSSINGHOFF

*Attesting Officer* *Commissioner of Patents and Trademarks*